United States Patent [19]

Ishida et al.

[11] Patent Number: 5,226,166
[45] Date of Patent: Jul. 6, 1993

[54] PARALLEL OPERATION PROCESSOR WITH SECOND COMMAND UNIT

[75] Inventors: Hitoshi Ishida; Shigeyuki Kazama; Minoru Shiga, all of Kanagawa, Japan

[73] Assignee: Mitsubishi Denki K.K., Tokyo, Japan

[21] Appl. No.: 478,196

[22] Filed: Feb. 12, 1990

[30] Foreign Application Priority Data

| Feb. 10, 1989 | [JP] | Japan | 1-31652 |
| May 17, 1989 | [JP] | Japan | 1-123154 |
| May 17, 1989 | [JP] | Japan | 1-123155 |
| May 29, 1989 | [JP] | Japan | 1-135406 |

[51] Int. Cl.⁵ ............... G06F 9/28; G06F 9/30
[52] U.S. Cl. ............... 395/800; 395/375; 364/229.2; 364/230.1; 364/231.8; 364/DIG. 1
[58] Field of Search ........... 364/200, 900, 229.2, 364/230.1, 231.8, 232.23; 395/800, 375

[56] References Cited

U.S. PATENT DOCUMENTS

| 4,025,771 | 5/1977 | Lynch, Jr. et al. | 395/375 |
| 4,626,989 | 12/1986 | Torii | 364/200 |
| 4,750,112 | 6/1988 | Jones et al. | 395/375 |
| 4,766,566 | 8/1988 | Chuang | 364/900 |
| 4,796,232 | 1/1989 | House | 365/189 |
| 4,811,208 | 5/1986 | Myers et al. | 364/200 |
| 4,855,903 | 8/1989 | Carleton et al. | 395/425 |
| 4,891,753 | 1/1990 | Budde et al. | 364/200 |
| 4,942,525 | 7/1990 | Shintani et al. | 364/200 |
| 4,967,339 | 10/1990 | Fukumaru et al. | 364/200 |
| 5,021,945 | 6/1991 | Morrison et al. | 395/375 |
| 5,050,068 | 9/1991 | Dollas et al. | 364/200 |
| 5,081,575 | 1/1992 | Hiller et al. | 395/325 |

OTHER PUBLICATIONS

Motorola "MC88100 User's Manual", pp. 1-13, 1989.

*Primary Examiner*—Gareth D. Shaw
*Assistant Examiner*—Dennis M. Butler
*Attorney, Agent, or Firm*—Kanesaka & Takeuchi

[57] ABSTRACT

A parallel processor is provided with a plurality of independently operable command units and a plurality of function units each connected to the command unit. In order to operate the command and functions units in parallel without any conflict, a data unit, a register file, and a carry bit are shared. A priority score board is provided to control the register file so that the command units operate independently according to the parallelism of a program, and detect and avoid a competition for a register according to the order of priority, making simultaneous execution of a plurality of commands possible and, thus, the process speed higher.

3 Claims, 5 Drawing Sheets

PARALLEL OPERATION PROCESSOR WITH SECOND COMMAND UNIT

BACKGROUND OF THE INVENTION

1. Field of the Invention

The present invention relates to parallel processors for use in processing information at high speeds.

2. Description of the Prior Art

A conventional parallel processor of this type—which is described by Carl Dobbs, Paul Reed, and Tommy Ng in "Supercomputing on Chip," VLSI SYSTEM DESIGN, Vol. IX, No. 5, May 1988, pp. 24-3-3—is shown in FIG. 5. The parallel processor consists of an integer unit 501 for performing addition and subtraction of integers and a bit field process; a floating point unit 502 for multiplication of floating point numbers or integers; a floating point unit 503 for performing other floating point arithmetic operations and division of integers; an optional special function unit 504; a data unit 505 for reading and writing data in a memory; a register file 506 used by the function unit to perform an arithmetic operation; a score board 507 for performing detection and avoidance of a competition for a register; a command unit 508 for fetching, decoding, and transferring a command to a function unit; a bus 509 for interconnecting the respective units to the register file; and a program counter 510 for controlling an address of the next command to be executed.

In operation, the command unit 508—which is divided into three pipelined stages; namely, fetch, decode, and transfer stages—completes a fetch in a clock cycle and passes the fetched command to the decode stage. The decode stage decodes part of the command and requests the score board 507 to prefetch the necessary operand from the register file 506 for the function unit corresponding to the command. The score board 507 has score board bits each corresponding to respective registers of the register file 506. The score board bit is set while the register is installed or during data operation and is cleared when the data operation is completed. In response to the request, the score board 507 checks the score board bits and, if the score board bit is set, waits until the score board bit is cleared. Then, it informs the command unit 508 of a use permit. When the operand necessary for execution of the command is fetched, the command is transferred to the function unit. Each function unit has several stages to execute the command using the prefetched operand.

In the above conventional parallel processor, however, only one command can be decoded in a clock cycle so that no more than one operation result can be obtained, resulting in the limited processing speed.

SUMMARY OF THE INVENTION

Accordingly, it is an object of the invention to provide a parallel processor which is object-interchangeable with a conventional processor and is able to simultaneously execute a plurality of commands according to the parallelism of a program at a speed higher than that of the conventional one.

According to the invention there is provided a parallel processor which includes a plurality of command units for simultaneously fetching a plurality of commands; a register file, a data unit, and a carry bit, all of which are shared by the command units; and a priority of score board for detecting, when parallel processing is interrupted because of data dependency or resources competition, a competition for a register between the command units and determining the order of execution based on the order of priority which has been predetermined according to the sequence of a program.

In order to operate a plurality of command units and a plurality of function units in parallel without any contradiction, the data unit, register file, and carry bit are shared, and the register file is controlled by the priority score board so that the command units operate independently according to the parallelism of a program, and the priority score board detects a competition for a register and avoids it making use of the order of priority, whereby a plurality of commands are executed simultaneously.

The above and other objects, features, and advantages of the invention will become more apparent from the following description when taken in conjunction with the accompanying drawings.

DESCRIPTION OF THE PREFERRED EMBODIMENT

Figure 1:
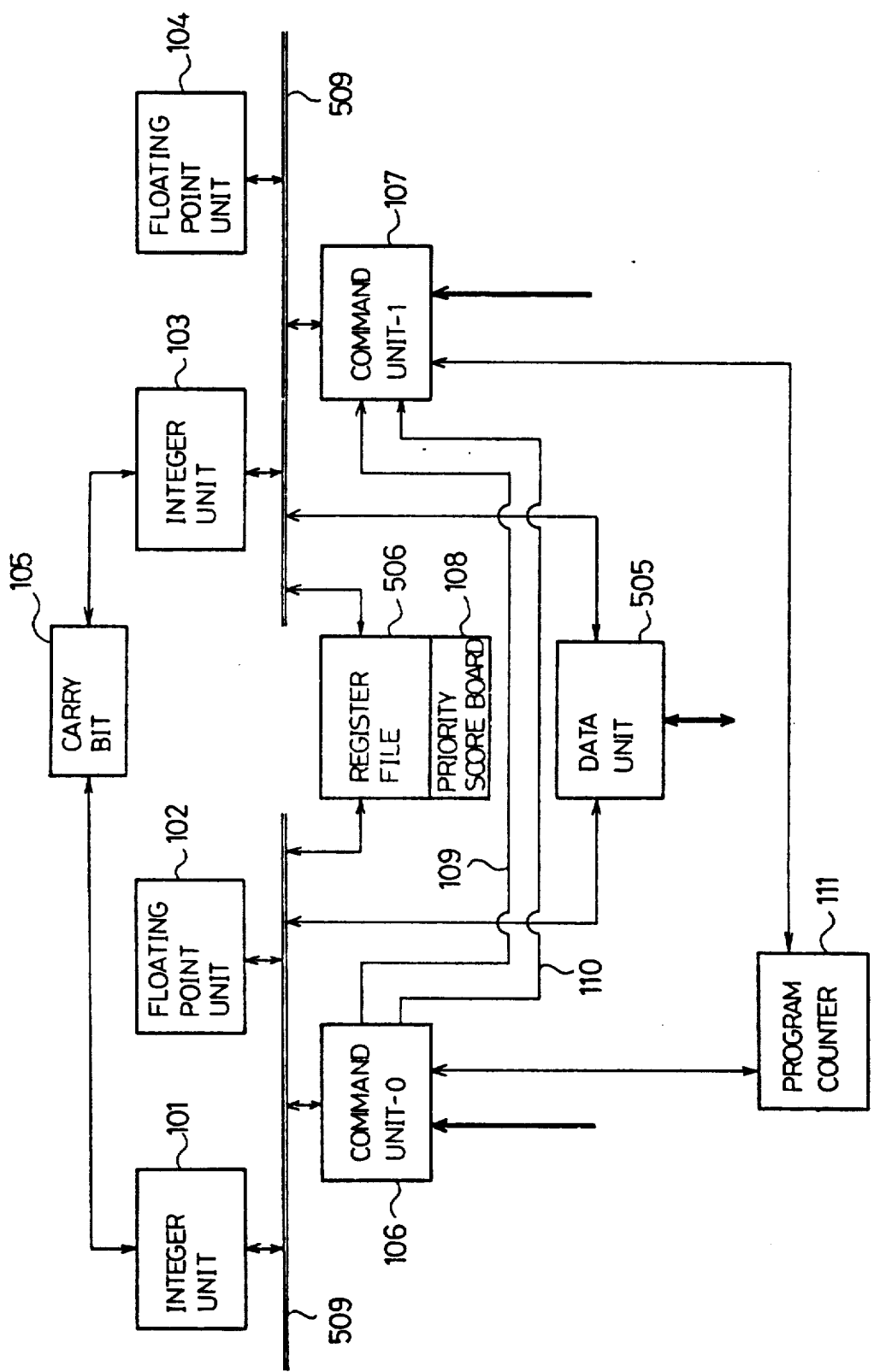
FIG. 1 is a block diagram of a parallel processor having a pair of command units according to an embodiment of the invention.
Figure 5:
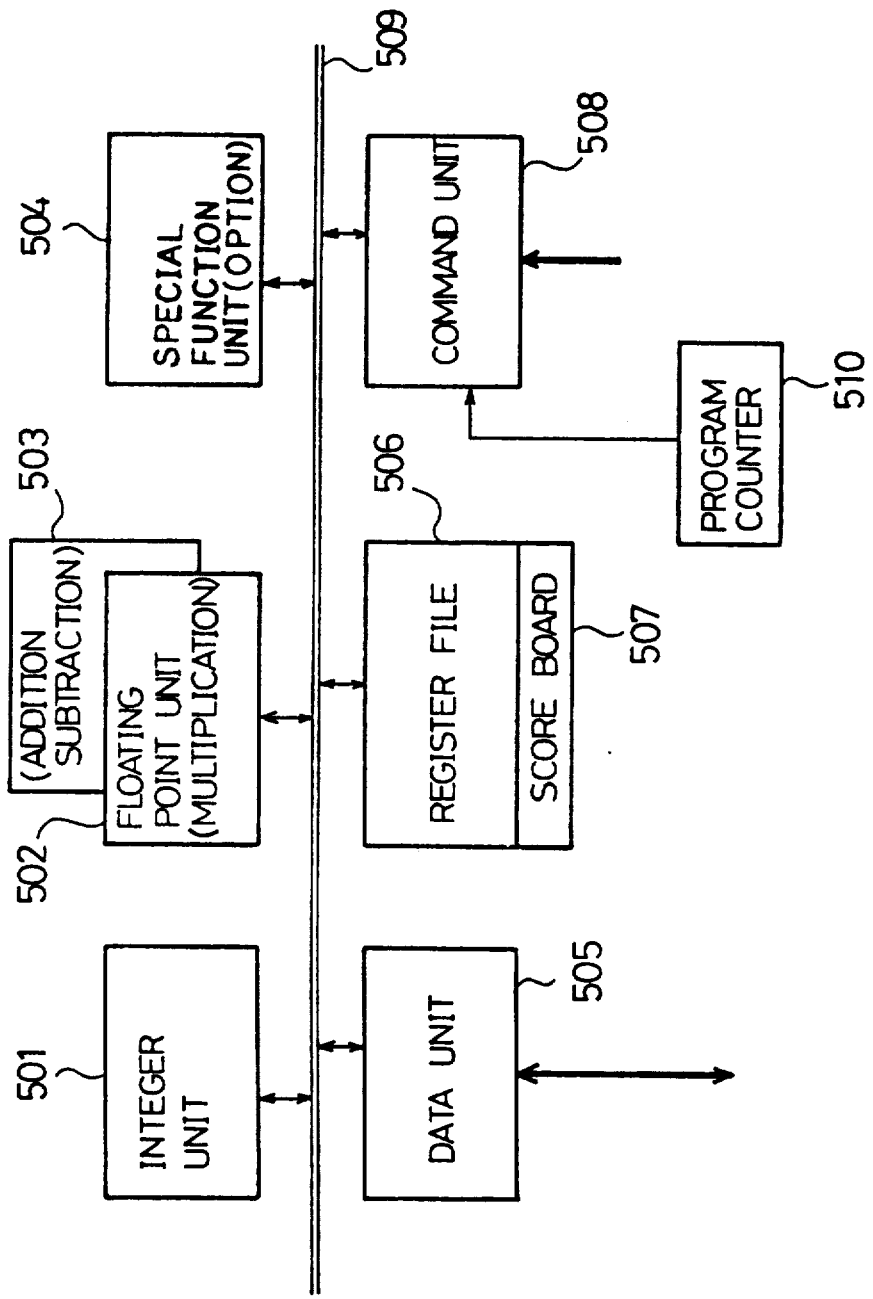
FIG. 5 is a block diagram of a conventional parallel processor.

In FIG. 1, the parallel processor includes a data unit 505; a register file 506; and a bus 509, all of which are identical with those of FIG. 5. Also, it includes a pair of integer units 101 and 103 for performing addition and subtraction of integers and logical operations; a pair of floating point units 102 and 104 for performing floating point arithmetic operations; a carry bit 105 which is common to both the integer units 101 and 103 and holds a carry; a command unit-0 106 for fetching the N-th command (N=0, 1, . . . ); a command unit-1 107 for fetching the (N+1)th command. The command unit-0 106 and unit-1 107 are connected to the integer units 101 and 103, and the floating point units 102 and 104, respectively, and the common data unit 505 and register file 506 via the bus 509.

A priority score board 108 has functions of detecting a competition for the register file 506 and avoiding it according to the order of priority. Since the command unit-0 106 and unit-1 107 fetch the N-th and (N+1)th commands, respectively, in this embodiment, the highest priority is given to the command unit-0 106 in order to maintain "priority of data" when parallel processing is interrupted. For example, if the score board 108 issues a use permit to each command unit when both the command unit-0 and unit-1 simultaneously request the same register, the process would be interrupted at this point (deadlock). In addition, when the command unit-0 106 and unit-1 107 try to execute a store command and a load command, respectively, in the same memory area, priority is given to the command unit 107 so that the results having nothing to do with the store command for the command unit-0 106 are loaded. In this way, the priority score board 108 plays a critical role in avoiding a contradiction in the program logic.

A control bus 109 is provided to transmit to the command unit-1 107 a signal for stopping, resuming, or invalidating transfer of an command to a function unit when the command unit-0 106 fetches a branch command. A bus 110 is provided to transmit to the command unit-1 107 a signal that the command unit-0 106 has transferred a command to the integer unit 101. A program counter 111 is provided to control an address of the next command to be executed.

A carry bit 105 holds a carry resulting from the computation in the integer unit 101 or 103 for reference to subsequent computation with a carry. The carry bit 105 gives priority to either the integer unit 101 or 103 in order to maintain the sequence of commands. Since the command unit-0 106 and unit-1 107 fetch the N-th and (N+1)th commands, respectively, in this embodiment, the highest priority is given to the integer unit 101. That is, when the two integer units simultaneously try to write a carry in the carry bit 105, a carry from the integer unit 101 is first written and then, a carry from the integer unit 103 is written.

The command unit-0 106 sends to the command unit-1 107 via the bus 110 a signal that the command has been transferred to the integer unit 101. The command unit-1 107 starts transfer of the command to the integer unit 103 after one clock cycle because it has a carry from the integer unit 101 only when it fetches a command with a carry. For commands without any carry, the command unit-1 107 ignores signals sent from the command unit-0 106.

Figure 2:
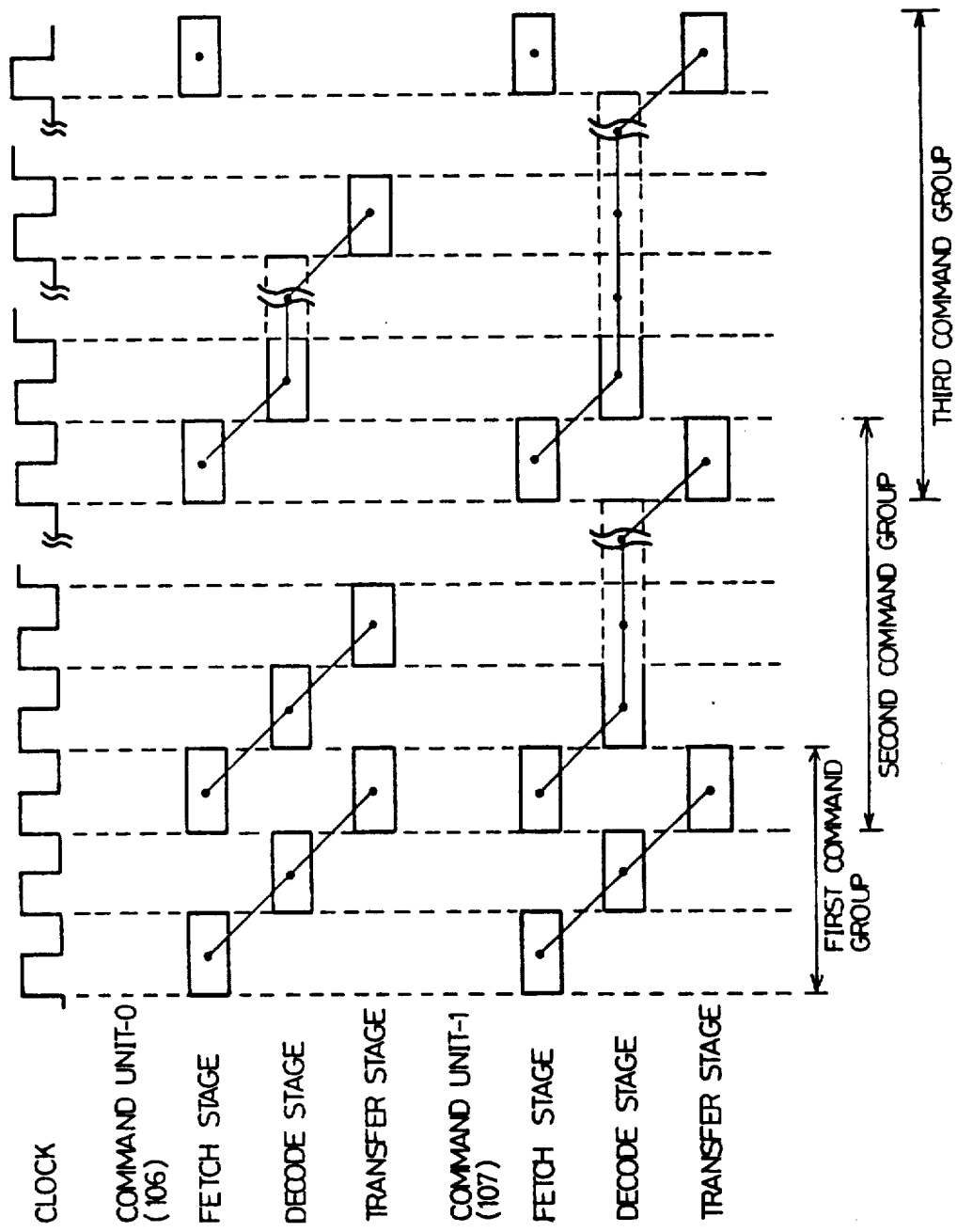
FIG. 2 is a timing chart showing the operations of the two command units of FIG. 1.

In FIG. 2, in the first command group there is no competition for any register, and prefetch of an operand has been made without difficulty. In the second command group there is a competition for a register in prefetch of an operand by the two command units, and there is a delay in transfer to a function unit by the command unit-1 107. In the third command group there is not only a competition for a register between the two command units but also the operand requested by the command unit-0 106 is being used, resulting in a double delay in transfer of the command to a function unit by the command unit-1 107.

Figure 3:
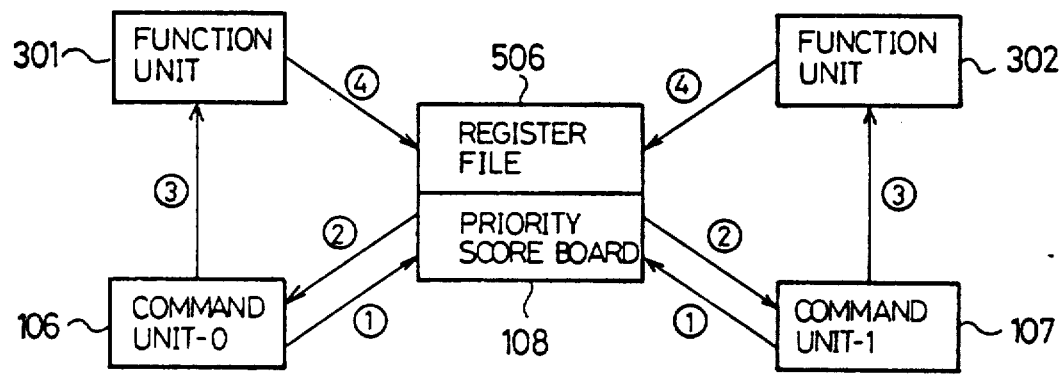
FIGS. 3A and 3B are block diagrams showing the operations of a priority score board useful for the parallel processor of FIG. 1.
Figure 3:
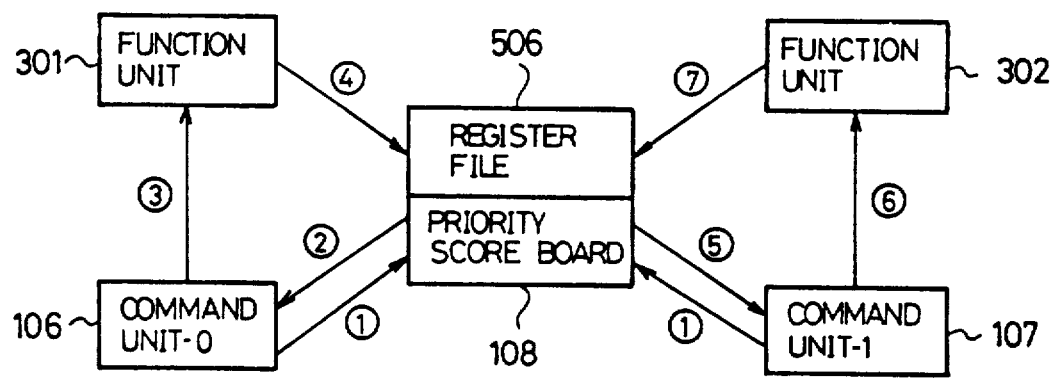

In FIGS. 3A, wherein no competition exists between the two command units, and 3B, wherein a competition exists between them, function units 301 and 302 are provided for the command unit-0 106 and unit-1 107, respectively. The priority score board 108 has functions of detecting a competition of resources between the commands and avoiding it according to the order of dependence of data. It issues an execution permit only when the register or function unit for the command fetched by the command unit is available. However, arbitration is made for only common function units.

Figure 4:
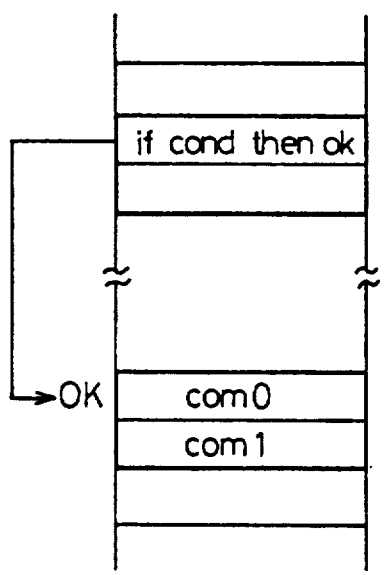
FIGS. 4A-4D shows respective branch patterns under branch instructions or commands.
Figure 4:
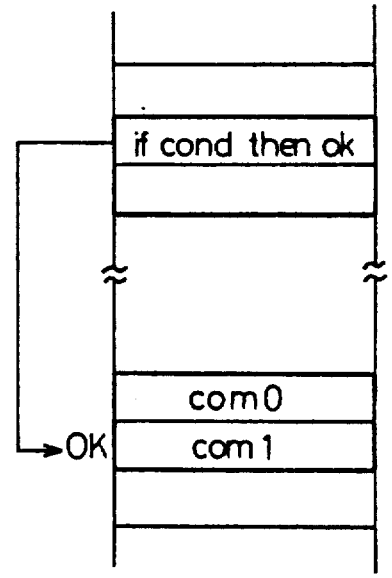
Figure 4:
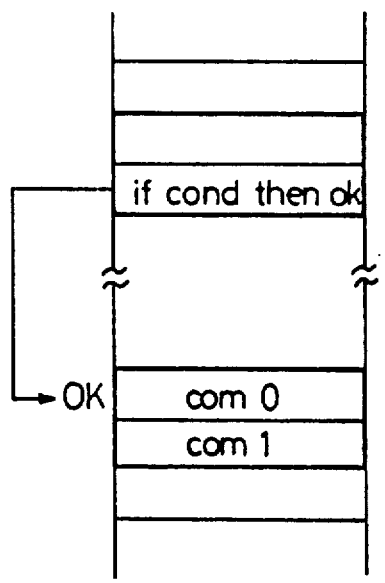
Figure 4:
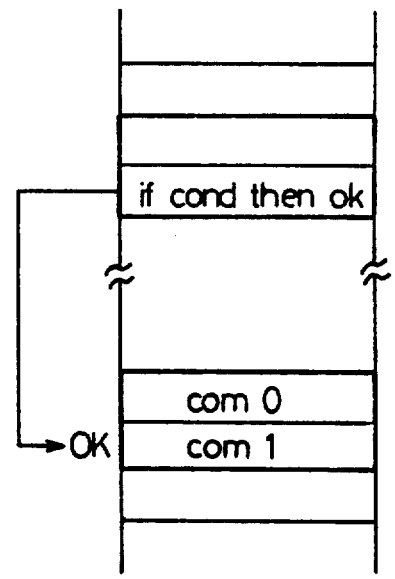

In FIGS. 4A and 4B, a branch instruction or command is fetched in a command unit-0 106, and the branched commands are fetched by the command unit-0 106 and unit-1 107, respectively. In FIGS. 4C and 4D, a branch command is fetched in the command unit-1 107, and the branched commands are fetched in the command unit-0 106 and unit-1 107. The command unit-0 106 sends to the command unit-1 107 a signal for stopping, resuming, or invalidating transfer of the command via the control bus 109 as shown in FIG. 1. If the branch command is an unconditional branch command, the command unit-0 106 sends to the command unit-1 107 via the control bus 109 a signal for invalidating the command fetched in the command unit-1 107 and informs the program counter 111 of the branch address. Upon reception of the address, the program counter 111 causes the command unit-0 106 and unit-1 107 to fetch commands com 0 and com 1, respectively, as shown in FIGS. 4A and 4B. In FIG. 4A, the two command units decode the commands, while in FIG. 4B, the program counter 111 sends to the command unit-0 106 a signal for invalidating the fetched command.

In FIGS. 4C and 4D, upon fetch of an unconditional branch command, the command unit-1 107 informs the program counter 111 of the branch address. In the same way as in FIGS. 4A and 4B, the program counter 111 causes the command unit-0 106 and unit-1 107 to fetch commands com 0 and com 1, respectively. In FIG. 4C, the commands are processed while in FIG. 4D, a signal for invalidating the fetched command is sent to the command unit-0 106.

If the branch command is a conditional branch command, the command unit-0 106 sends to the command unit-1 107 via the control bus 109 a signal for stopping transfer of the command to a function unit. Then, if the integer unit 101 determines that the branch conditions are not satisfied, it sends to the command unit-1 107 via the control bus 109 a signal for resuming transfer of the command to the function unit. If the branch conditions are satisfied, it sends to the command unit-1 107 via the control bus 109 a signal for invalidating the command and informs the program counter 111 of the branch address. Upon reception of the branch address, the program counter 111 causes the command unit-0 106 and unit-1 107 to fetch commands com 0 and com 1, respectively.

In FIG. 4A, the two command units decode the commands, while in FIG. 4B, the program counter 111 sends to the command unit-0 106 a signal for invalidating the fetched command because com 0 is a command to be not executed. In FIGS. 4C and 4D, when the command unit-1 107 fetches a conditional branch command, the integer unit 103 makes a decision on the branch conditions. If the branch conditions are not satisfied, then the process is carried out without any branching. If the branch conditions are satisfied, the command unit-1 107 informs the program counter 111 of the branch address. Upon reception of the address, the program counter 111 causes the command unit-0 106 and unit-1 107 to fetch commands com 0 and com 1, respectively. In FIG. 4C, the commands are decoded, while in FIG. 4D, a signal for invalidating the fetched command is sent to the command unit-0 106.

How the priority score board 108 detects a competition for a register and avoids it making use of the order of priority will be described. As shown in FIG. 2, the two command units each are divided into three pipelined stages; namely, fetch, decode, and transfer stages. The fetch of a command is synchronized with the start of a transfer to a function unit by the command unit-1 107. Both the command units fetch commands in a clock cycle and pass the fetched commands to the decode stage, respectively. Then, each command unit causes the function unit corresponding to the command to prefetch the operand necessary for the arithmetic operation from the register file 506. In response to the request for the operand by each command unit, the priority score board 108 checks the score board bit and the vacancy of the function unit to be used by the command. If the function unit to be used by the command is available, the priority score board 108 sends a register available signal to the command unit-0 106 unless the score board bit for the register requested by the command unit-0 106 is set. Only if the score board bit for the register requested by the command unit-1 107 is not set and there is no competition for the register requested by the command unit-0 106, an available signal is sent to the command unit-1 107. Since each function unit is unable to prefetch any operand unless these conditions are satisfied, it is necessary to put transfer to the function unit in a wait condition.

In FIG. 3A, since there is no competition for an operand between the two command units—corresponding to the first command group in FIG. 2, three operations of requesting an operand ①, receiving an available signal ②, and transferring the command to the corresponding function unit ③ are carried out in parallel. The computation result of the function unit is written in the register ④. In FIG. 3B, since there is a competition between registers for a requested operand ①—corresponding to the second command group in FIG. 2, the priority score board 108 issues an available signal to only the command unit-0 106. The command unit-1 107 receives an available signal ⑤—which is sent after the command unit-0 106 transferred the command to the function unit ③, and the function unit wrote the computation result in the register ④—and starts transfer of the command to the corresponding function unit ⑥. The function unit has several pipelined stages to execute the command using the prefetched operand and writes the result in the register.

How the data unit 505 controls the detection and avoidance of a competition will be described. When each command unit fetches a load or store command, the data unit 505 issues a request to the priority score board 108 to cause the data unit 505 to prefetch the operand. The priority score board 108 sends an available signal to the requesting command unit according to the conditions of register competition and vacancy of the data unit 505. The command unit—which has received the available signal from the priority score board 108—transfers the command to the data unit 505.

Alternatively, the two floating point units 102 and 104 may be removed in FIG. 1. With this embodiment, it is possible to achieve the maximum two commands/cycle with less hardware where there is no need for the floating point arithmetic operation such as in control systems.

As has been described above, according to the invention, the parallel processor is provided with a plurality of independently operable command units and a plurality of function units each connected to the corresponding command unit and a common register file, a data unit, a carry bit, and a priority score board for detecting and avoiding data dependency or competition for resources so that the command units operate independently without contradiction according to the parallelism of a program, thus resulting in the increased process speed.

We claim:

1. A parallel operation processor, comprising:
    a first integer unit connected to a bus for performing integer or logic operations and generating a carry signal;
    a first command unit connected to said bus for access to said first integer unit through said bus and pipelining fetch, decode, and transfer of a first command to said first integer unit;
    a second integer unit connected to said bus and being identical with said first integer unit in terms of function; f
    a second command unit connected to said bus for access to said second integer unit to transfer a second command to said second integer unit and receive a control command from said first command unit through a control bus, and being identical with said first command unit in terms of function;
    a carry bit connected to said first and second integer units, into which a carry signal is selectively inputted by said first and second integer units for holding a carry resulting from an operation performed by said first and second integer units;
    a program counter connected said first and second command units, for feeding said first and second command units with a first address of said first command and a second address of said second command, respectively, and incrementing address values;
    a data unit connected to said bus to permit selective data write or read by said first and second command units;
    register file consisting of a plurality of registers connected to said bus and being accessed by said first and second integer units and said first and second command units to read and write data for performing arithmetic and logic and operations; and
    a priority score board connected to said register file and having a plurality of score bits each corresponding to each of said registers of said register file and being set during use of a corresponding register by any one of said integer units and said command units.

2. The parallel operation processor of claim 1, wherein said priority score board puts a priority on said first command unit which has an address of said first command if both of said first and second command units access the same register at the same time.

3. The parallel operation processor of claim 1, which further comprises:
    a first floating point unit connected to said bus for performing floating point operations when accessed by said first command unit; and
    a second floating point unit connected to said bus for performing floating point operations when accessed by said second command unit.

* * * * *